(No Model.)  5 Sheets—Sheet 1.
M. G. BUNNELL.
GRADING AND DITCHING MACHINE.
No. 552,038. Patented Dec. 24, 1895.
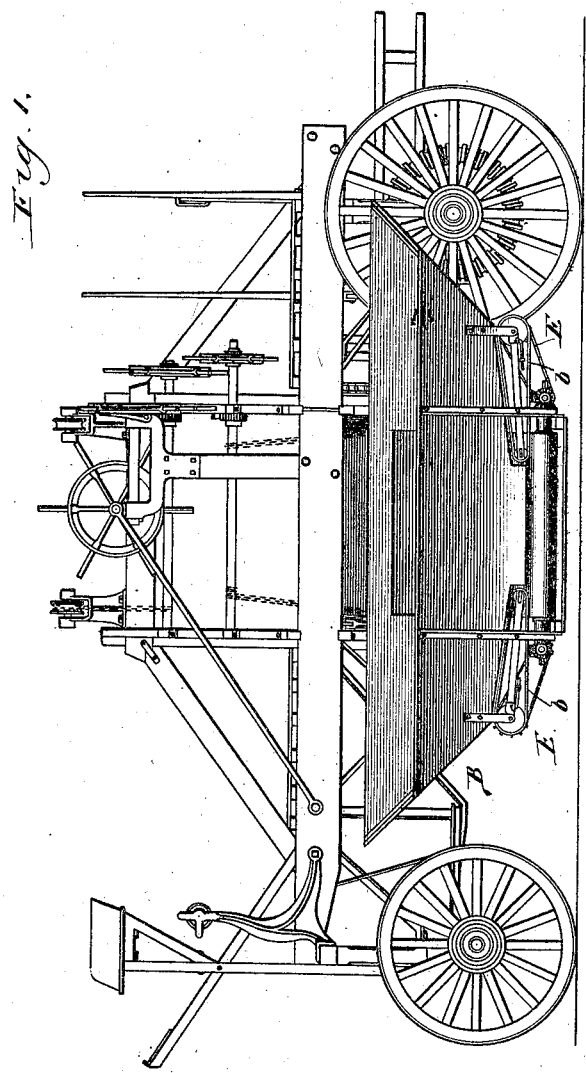
Witnesses
W. Rowiter
Harry C. Kennedy
Inventor
Morton G. Bunnell
By Chas. G. Page
Atty.

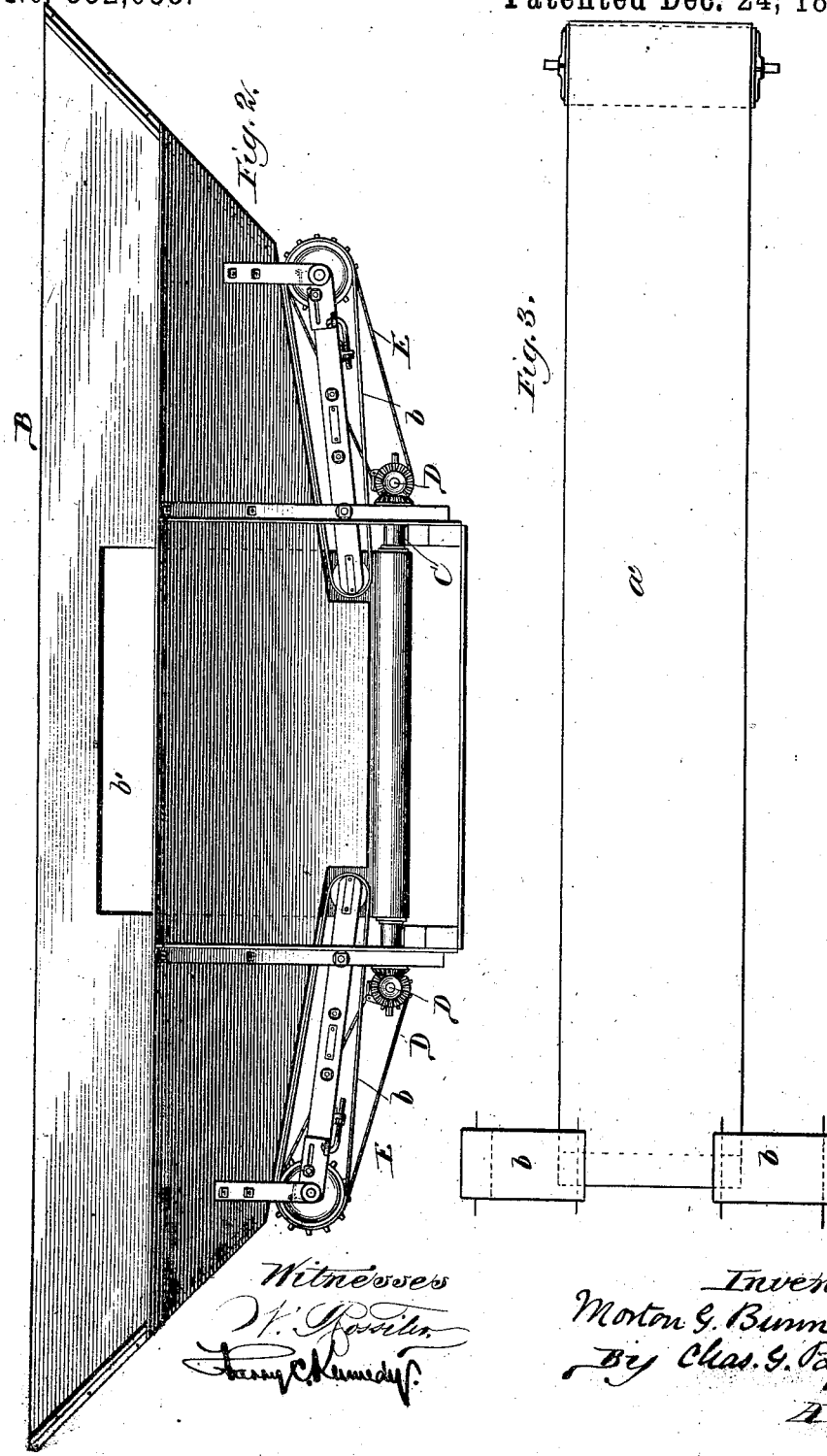

(No Model.) 5 Sheets—Sheet 3.
M. G. BUNNELL.
GRADING AND DITCHING MACHINE.
No. 552,038. Patented Dec. 24, 1895.
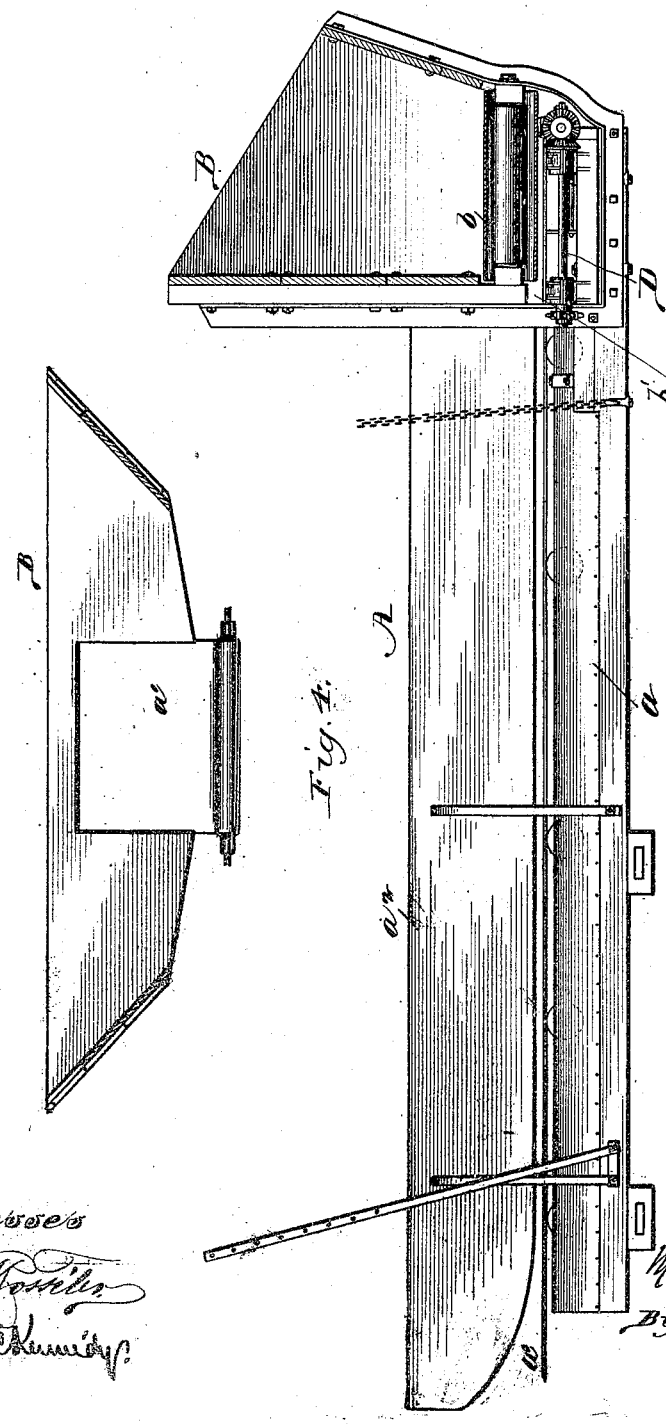

(No Model.)
M. G. BUNNELL.
GRADING AND DITCHING MACHINE.
No. 552,038. Patented Dec. 24, 1895.
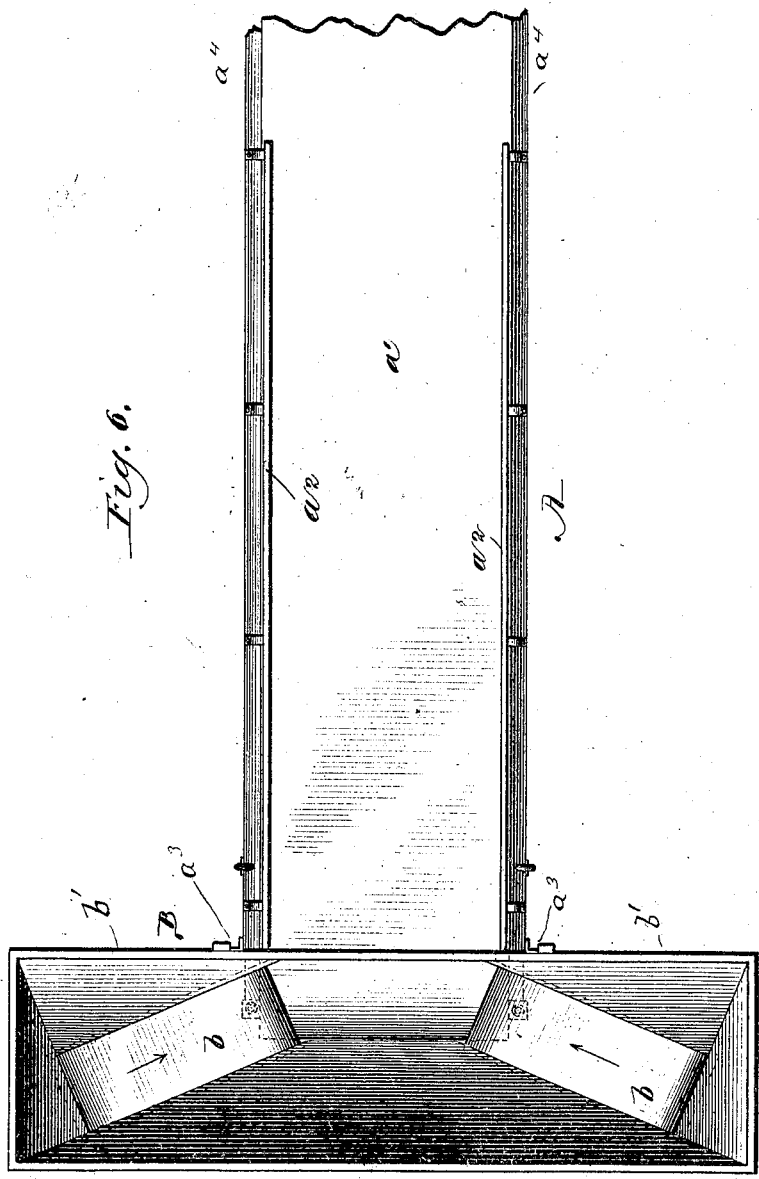

(No Model.) 5 Sheets—Sheet 5.
M. G. BUNNELL.
GRADING AND DITCHING MACHINE.
No. 552,038. Patented Dec. 24, 1895.
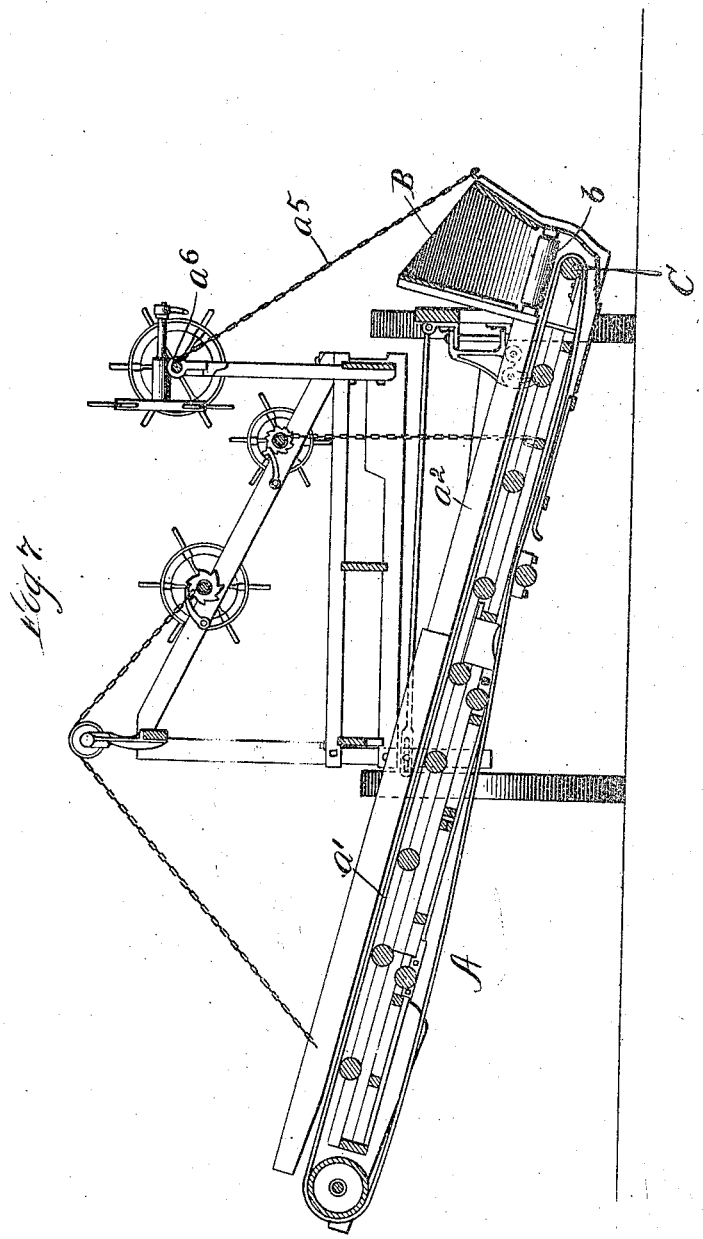

UNITED STATES PATENT OFFICE.

MORTON G. BUNNELL, OF CHICAGO, ILLINOIS, ASSIGNOR, BY MESNE ASSIGNMENTS, TO ANNA B. AUSTIN.

GRADING AND DITCHING MACHINE.

SPECIFICATION forming part of Letters Patent No. 552,038, dated December 24, 1895.

Application filed March 25, 1890. Serial No. 345,291. (No model.)

*To all whom it may concern:*

Be it known that I, MORTON G. BUNNELL, a citizen of the United States, residing at Chicago, in the county of Cook and State of Illinois, have invented a certain new and useful Improvement in Supplemental Conveyers for Grading and Ditching Machines, of which the following is a specification.

My invention while applicable to various constructions of grading and ditching machines is particularly designed as an improved attachment to the construction of grading and ditching machine set forth in Letters Patent of the United States to W. J. Edwards, November 27, 1888, No. 393,467. In working a machine of such character it becomes at times desirable to deliver the plowed-up soil at a greater distance from the plow than can be attained with a single machine.

The object of my invention is to overcome such difficulty, and to such end I provide means whereby two machines can be run side by side, and while but one is used for plowing up the soil the two machines can be used conjointly for conveying and delivering the same from the plow to a point remote from that whereat the soil is plowed up.

In the accompanying drawings, Figure 1 represents in side elevation a grading and ditching machine provided with my improvement. Fig. 2 represents in elevation on a larger scale the conveyer hopper or receiver. Fig. 3 is a diagram illustrating the elevating-conveyer belt and the two conveying-belts, which in certain other figures are shown at the bottom of the hopper. Fig. 4 is a longitudinal section on a vertical plane through a portion of the conveyer and also through the hopper. Fig. 5 represents a section taken through a portion of the hopper on a plane transverse to the length of the conveyer-belt, which latter is partially show Fig. 6 is a plan of the hopper and a portio of the conveyer, and shows the conveying-aprons, which form the bottom of the hopper, arranged obliquely to the line of the main conveying belt or apron. Fig. 7 is a section taken transversely through the machine, the plane of the section being through the elevating-conveyer.

The machine represented in Figs. 1 and 7 is generally similar to that described in the patent hereinbefore referred to, and hence need not be particularly described, it being understood, however, that the plow and also the elevating-conveyer shown in said patent have been removed and that an elevating-conveyer provided with a hopper at its receiving end has been substituted, so as to adapt the machine for receiving and conveying in accordance with my improvement. The elevating-conveyer A is arranged transversely to the length of the machine and preferably extends under the body-frame thereof, substantially in the way in which the elevating-conveyer is arranged in said patent. This elevating-conveyer A may be suspended in any suitable manner or in the way in which the elevating-conveyer is suspended in said patent. It is, however, desirably suspended or attached to the machine so that it will incline upwardly from its receiving end, and it is also desirably made of such length that its delivery end shall extend out from one side of the machine, as shown in Fig. 7.

The elevating-conveyer comprises a suitable frame $a$ and an endless conveying belt or apron $a'$, and like the elevating-conveyer in the patent referred to, it is desirably provided with guards $a^2$, so as to form a passage-way whereof the upper leaf of the conveying belt or apron forms the bottom. This elevating-conveyer is provided at its receiving end with a hopper B, constituting a receiver into which the soil can be deposited from the elevating-conveyer of another machine. The casing which forms the sides of this hopper is secured to the frame of the elevating-conveyer, and to such end Fig. 6 illustrates the rear side $b'$ of said casing secured to said frame of the elevating-conveyer by cleats or angle-irons $a^3$, which are understood to be bolted to the casing and frame. By such arrangement the elevating-conveyer is practically provided at one end with a hopper or receiver. This hopper has its bottom mainly formed by a couple of endless conveying belts or aprons $b$, which are so arranged that when they are caused to travel in the direction of the arrows in Fig. 6 they will convey the soil deposited in the hopper toward and deposit the same onto the endless belt $a'$ of the elevating-conveyer. By such arrangement a machine thus equipped can be driven alongside a machine provided both with an elevating-conveyer and a plow, as in said patent, so that during operation the plowed-up soil will be first taken from the plow by the elevating-conveyer of the machine thus furnished with the plow and then discharged into the hopper B, from whence it will be taken by the conveyer-belt $a'$ of the elevating-conveyer with which the second machine is supplied.

The comparatively short conveyer-belts $b$ can be arranged at right angles to the line of belting $a'$, as illustrated by the diagrammatic view, Fig. 3, or said belts $b$ can be arranged obliquely to the line of belting $a'$, as in Fig. 6, in which case any danger of long rods being caught by the corners of the hopper will be avoided.

The bottom of the hopper is of course open so that the two belts $b$ and a portion of the belt $a'$ may form its bottom, and its back is also provided with a suitable opening $b'$, so as to permit the soil and other matters deposited therein to be carried out by the conveyer-belt $a'$.

The short conveyer-belts $b$ can be driven from the belt-roll C at the receiving end of the elevating-conveyer by means of link-belts, or by any other suitable gearing, the mode herein shown of operating the belts $b$ being to gear-connect short rotary shafts D with the ends of the belt-roll C, and connect sprockets upon said shafts with certain belt-rolls for the belts $b$ by link-belts E. The belt-roll C can be driven as in said patent or in any other suitable way.

From the foregoing it will be seen that the machine comprises an elevating-conveyer provided at one end with a receiver comprising a hopper-casing which is secured to a frame $a^4$ provided for the rolls of the belt $a'$, and the short endless belts or aprons $b$ which first receive the soil deposited in said hopper-casing and then deposit such soil onto the long endless conveying-belt $a'$ which extends under the points at which the soil is delivered from the short endless belts or aprons $b$. By arranging the system of conveying-belts $a'$ and $b$ $b$ as illustrated, the belt $a'$ forms in effect a portion of the hopper-bottom, (see Fig. 6,) and by arranging the belts $b$ $b$ at opposite sides of the longitudinal middle portion of belt $a'$, the said bottom is practically extended, and furthermore, the oblong hopper-casing can be made much longer than the width of belt $a'$, and thereby permit it to receive the soil discharged from another machine driven alongside a machine provided with the within-described improvement, although the point of discharge of the one machine may not be directly opposite the receiving portion of the belt $a'$ in the other machine.

The long frame of the elevating-conveyer can be suspended by chains, substantially in the way the frame of the elevating-conveyer is suspended in the patent hereinbefore referred to, and since the receiving end of the said frame will be weighted by the hopper-casing and belts $b$ $b$, a stay-chain $a^5$, Fig. 7, can connect said casing with a drum or winding-rod $a^6$, which can be operated for the purpose of adjusting the length of chain between the rod and hopper-casing with reference to the elevation of the receiving end of the elevating-conveyer. With further reference to the receiving and conveying belts $b$ it is understood that they are positively operated during the progress of the machine by power-transmitting means which is primarily operated by one of the wheels of the carriage, and that this application does not comprise the receiving and conveying belts operated solely by the weight of the material thereon, as embodied in application Serial No. 399,809 of myself and Clement F. Hinman.

What I claim as my invention is—

A machine for service in grading and ditching work, comprising a wheeled carriage, and an attachment supported from the carriage and consisting of an elevating conveyer constructed with belt rolls and an endless conveying belt which is driven during the progress of the carriage, a hopper positioned at one side of the carriage and having at its bottom a receiving and conveying belt arranged to discharge onto the conveying belt of the elevating conveyer, and gearing for driving the belt at the bottom of the hopper from a belt roll of the elevating conveyer, substantially as described.

MORTON G. BUNNELL.

Witnesses:
CHAS. G. PAGE,
HARRY C. KENNEDY.